(12) United States Patent
Parikh (10) Patent No.: US 6,414,719 B1
(45) Date of Patent: Jul. 2, 2002

(54) MOTION ADAPTIVE MEDIAN FILTER FOR INTERLACE TO PROGRESSIVE SCAN CONVERSION

(75) Inventor: Sandip Parikh, Plainsboro, NJ (US)

(73) Assignees: Sarnoff Corporation, Princeton, NJ (US); Motorola Inc., Schaumburg, IL (US)

( * ) Notice: Subject to any disclaimer, the term of this patent is extended or adjusted under 35 U.S.C. 154(b) by 0 days.

(21) Appl. No.: 09/579,194

(22) Filed: May 26, 2000

(51) Int. Cl.$^7$ .............................. H04N 7/01; H04N 5/21; H04N 11/20
(52) U.S. Cl. ...................... 348/448; 348/451; 348/452
(58) Field of Search ................................ 348/448, 451, 348/452, 607, 618, 619, 620; 382/261, 262; H04N 7/01, 11/20, 5/21, 5/213, 5/217

(56) References Cited

U.S. PATENT DOCUMENTS

| | | | |
|---|---|---|---|
| 5,412,436 A | | 5/1995 | Christopher ................. 348/700 |
| 5,493,338 A | * | 2/1996 | Hong .......................... 348/441 |
| 5,574,512 A | * | 11/1996 | Saeger ........................ 348/607 |
| 5,689,305 A | * | 11/1997 | Ng et al. ..................... 348/448 |
| 5,793,435 A | * | 8/1998 | Ward et al. .................. 348/448 |
| 5,929,918 A | * | 7/1999 | Marques Pereira et al. . 348/448 |
| 5,943,099 A | * | 8/1999 | Kim ............................ 348/448 |
| 5,995,154 A | * | 11/1999 | Heimburger ................. 348/448 |
| 6,037,990 A | * | 3/2000 | Ogawa et al. ............... 348/452 |
| 6,061,100 A | * | 5/2000 | Ward et al. .................. 348/607 |
| 6,067,125 A | * | 5/2000 | May ............................ 348/607 |
| 6,072,531 A | * | 6/2000 | Shibano ....................... 348/448 |
| 6,122,017 A | * | 9/2000 | Taubman ..................... 348/620 |
| 6,141,056 A | * | 10/2000 | Westerman .................. 348/448 |

OTHER PUBLICATIONS

Chen et al, "Frame–Rate Up–Conversion Using Transmitted True Motion Vectors", 1998 IEEE Second Workshop on Multimedia Signal Processing, Dec. 7–9, 1998, Redondo Beach, California, USA, pp. 622–627.

Kwon et al "A Motion–Adaptive De–Interlacing Method", *IEEE Transactions on Consumer Electronics*, Aug. 1992, vol. 38, No. 3, pp. 145–149.

Hentschel, Christian, "Subjective Assessment of Various Methods for scan Conversion", *IEEE Transactions on Consumer Electronics*, Feb. 1995, vol. 41, No. 1, pp. 65–72.

Karlsson et al, "Evaluation of Scanning Rate Up Conversion Algorithms; Subjective Testing of Interlaced to Progressive Conversion", *IEEE Transactions on Consumer Electronics*, Aug. 1992, vol. 38, No. 3, pp. 162–167.

Roberts, A., "The Improved Display of 625–Line Television Pictures: Adaptive Interpolation", BBC Research Department, Engineering Division, The British Broadcasting Corporation, May 1985, pp. 1–5.

\* cited by examiner

*Primary Examiner*—John W. Miller
*Assistant Examiner*—Brian P. Yenke
(74) *Attorney, Agent, or Firm*—William J. Burke (57) ABSTRACT

Apparatus and methods relating to a motion adaptive median filter. In an embodiment of the present invention, a motion adaptive median filter includes a motion detect circuit, a soft switch, and a median filter. The motion detect circuit can have an output. The soft switch can have a first input and an output, and the first input of the soft switch can be coupled to the output of the motion detect circuit. The median filter can have a first input, and the first input of the median filter can be coupled to the output of the soft switch.

12 Claims, 5 Drawing Sheets

FIG. 6

MOTION ADAPTIVE MEDIAN FILTER FOR INTERLACE TO PROGRESSIVE SCAN CONVERSION

FIELD OF THE INVENTION

Embodiments of the present invention relate to conversion of interlaced scan video signals to progressive scan video signals. More particularly, embodiments of the present invention relate to embodiments of apparatus and methods relating to a motion adaptive median filter for interlace to progressive scan conversion.

BACKGROUND OF THE INVENTION

Known methods can convert an interlaced scan video signal to a progressive scan video signal. An interlaced scan video signal can include a succession of fields, each field including a plurality of scan lines. Two successive fields of an interlaced scan video signal can define a frame where the first field includes the odd scan lines (e.g., scanning lines 1, 3, 5, 7, etc.) and the second field includes the even scan lines (e.g., 2,4,6,8, etc.).

A de-interlacing method can generate an interpolated line of interpolated pixels between two successive lines of a field. Examples of known methods of de-interlacing an interlaced scan video signal include temporal interpolation and spatial interpolation. In an area (e.g., an area of a video picture generated on a video display by a video signal, etc.) with no or low motion, temporal interpolation can be preferred. In an area with high motion, spatial interpolation can be preferred. In low/no motion areas, spatial interpolation (e.g., a low pass filter) typically tends to make the picture softer while temporal interpolation can maintain picture details. In high motion areas, temporal interpolation typically tends to introduce motion artifacts, while spatial interpolation avoids these. In view of the foregoing, it can be appreciated that a substantial need exists for methods and apparatus which can advantageously provide motion adaptive median filtering for interlace to progressive scan conversion.

DETAILED DESCRIPTION

According to an embodiment of the present invention, pixel values from a current field, a previous field, and a next field of an interlaced scan video signal can be used to determine a motion estimate value, a spatial interpolation value, and a temporal interpolation value. An weighted average value can be output by a soft switch having the motion estimate value as a weighting factor input and the spatial interpolation value and the temporal interpolation value as inputs. A predicted pixel value of a progressive frame generated based at least in part on the interlaced scan video signal can be output by a median filter having as inputs the weighted average value and the pixel values from the current field, the previous field, and the next field.

With the emergence of digital television (DTV) and high definition television (HDTV), scan and format conversion between the Advanced Television Systems Committee (ATSC) input formats and other output formats can become necessary for a Moving Pictures Expert Group (MPEG) decoder. Interlaced video can have limitations that produce visible artifacts (e.g., line crawl, flicker, etc.) Artifacts can be particularly objectionable when an input is a standard definition (SD) sized interlaced video signal (i.e., 720×480, 130) and an output is high definition (HD) video (e.g., 1080I, 720P) or progressive SD (480P). Displaying 480I input with good quality on high quality SD or HD monitors can be important because much existing material (e.g., video material) is in interlaced format and interlaced television broadcast may be around for an extended period of time. Embodiments of the present invention can advantageously de-interlace interlaced video for upscaling to HD formats, displaying on progressive displays, etc.

Figure 1:
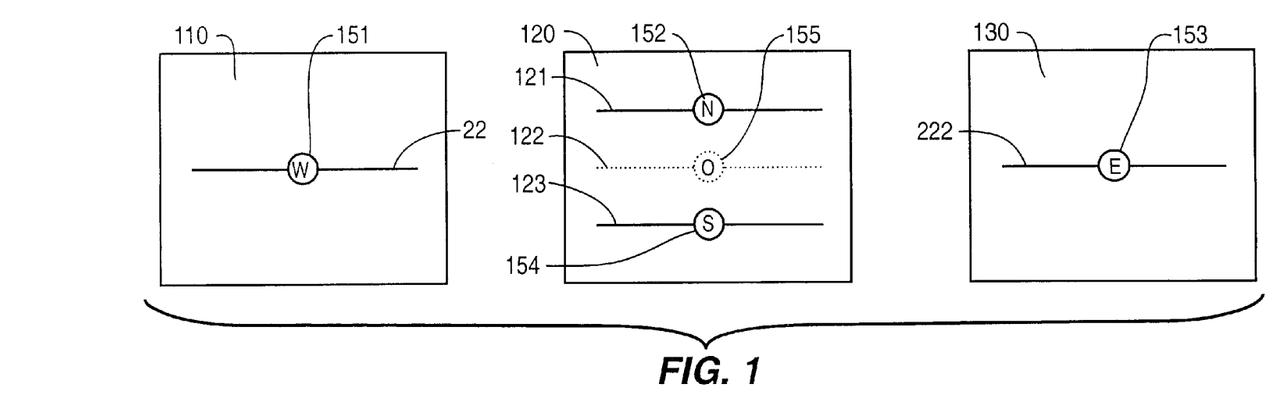
FIG. 1 shows pixels in accordance with an embodiment of the present invention.

FIG. 1 shows pixels in accordance with an embodiment of the present invention. Methods and apparatus in accordance with embodiments of the present invention can generate an output progressive frame including predicted O pixel 155 of a predicted scan line 122 based at least in part on pixel data from previous field 110, current field 120, and next field 130 of an interlaced scan video signal. Current field 120 can have an N pixel 152 of a scan line 121 and an S pixel 154 of a scan line 123. N pixel 152 can be the pixel above the O pixel 155 being predicted in the current field 120, and S pixel 154 can be the pixel below the pixel being predicted in the current field 120. W pixel 151 of scan line 22 of previous field 110 can be the pixel in the previous field (of opposite polarity) at the same spatial location as O pixel 155, and E pixel 153 of scan line 222 of next field 130 can be the pixel in the next field (of opposite polarity) at the same spatial location as O pixel 155.

Figure 2:
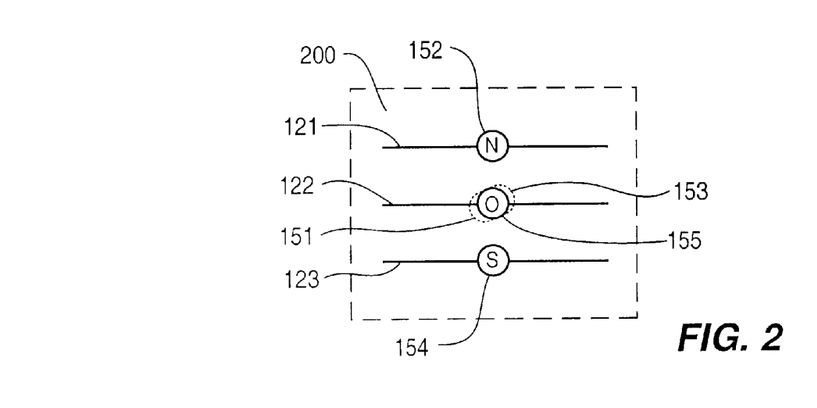
FIG. 2 shows pixels in accordance with an embodiment of the present invention.

FIG. 2 shows pixels in accordance with an embodiment of the present invention. An output progressive frame 200 can include predicted scan line 122 between scan line 121 and scan line 123. In an embodiment, W pixel 151 of previous field 110, predicted O pixel 155, and E pixel 153 of next field 130 are pixels in different fields that have the same spatial location. In accordance with an embodiment of the present invention, a de-interlacing method outputs a progressive frame by de-interlacing each current field of an input interlaced pixel sequence based at least in part on data from the current field, the previous field, and the next field. In an embodiment, when a top field is de-interlaced, the previous and next field are bottom fields, and when a bottom field is de-interlaced, the previous and next field are top fields. Half of the line in the output progressive frame can be identical to the lines in the current field, and the other half can be generated in accordance with embodiments of the present invention.

Figure 3:
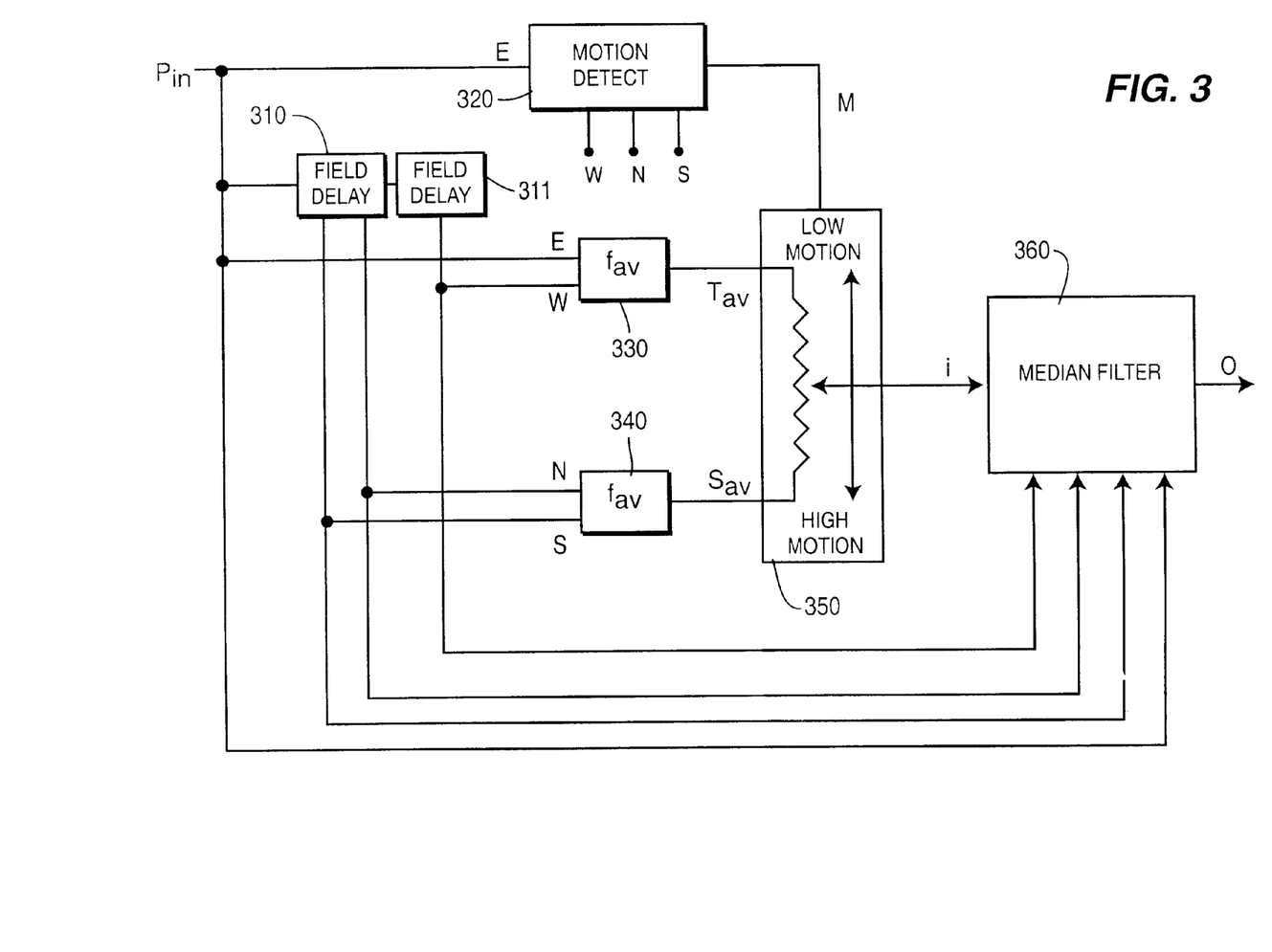
FIG. 3 shows an apparatus in accordance with an embodiment of the present invention.

FIG. 3 shows an apparatus in accordance with an embodiment of the present invention. A predicted pixel O signal can be generated based on pixel sequence $P_{in}$. Pixel sequence $P_{in}$ can include a sequence of pixel values and be input to field delay 310 and field delay 311 to generate pixel E, W, N, and S signals, where pixel N is the pixel above pixel O in the current field (i.e., pixel N and pixel O have the same horizontal position), pixel S is the pixel below pixel O in the current field (i.e., pixel S and pixel O have the same horizontal position), pixel W is the pixel in the previous field (of opposite polarity) at the same spatial location as O (i.e., pixel W and pixel O have the same vertical and horizontal position), and pixel E is the pixel in the next field (of opposite polarity) as the same spatial location as 0 (i.e., pixel W and pixel O have the same vertical and horizontal position). Averaging circuit 330 can be coupled to field delay 311 and generate a temporal average signal $T_{av}$ based on pixel E and pixel W signals. An averaging circuit can include an adder and a divider, an adder and a shift register, etc. The term "coupled" encompasses a direct connection, an indirect connection, etc. Averaging circuit 340 can generate a spatial average signal Say based on pixel N and pixel S signals.

Motion detect circuit 320 can generate a motion signal M based on pixel E, W, N, and S signals. In one embodiment, motion signal M is a motion estimation signal having a range from zero to one. Motion signal M can equal CLIP ($K_s$* (|E−W|/(|E−W|+|N−S|))). CLIP (n) is clip to 1 function where CLIP (n)=1 when (n>=1), and CLIP (n)=n, when (n<1). $K_s$ is a slope control factor that can control how quickly motion signal M changes from 0 to 1 as motion (|E−W|) increases for a given amount of detail (|N−S|) in a picture. In one embodiment, a slope factor of 32 provided good results.

Soft switch 350 can output an interpolated pixel i signal based on receiving temporal average signal $T_{av}$ and spatial average signal $S_{av}$ as signal inputs and motion signal M as a weighting factor input. Interpolated pixel i signal can be a weighted average of $T_{av}$ and $S_{av}$ based on the value of motion signal M. i can be equal to $T_{av}$ when motion signal M is zero, and i can be equal to $S_{av}$ when motion signal M is one. In one embodiment, interpolated pixel signal i equals (M*(N+S)/2)+((1−M)*(E+W)/2).

Median filter 360 can output predicted pixel O signal based at least in part on median filtering pixel i, E, W, N, and S signals. In one embodiment, median filter 360 is a 5-point median filter. In an embodiment of the present invention, a 5-point median filter having pixel i, E, W, N, and S signals as inputs provided advantageous results in low motion areas because the filter was partially biased toward using one of pixel E, W, and i signals, where pixel i signal tends toward $T_{av}$. In an embodiment of the present invention, a 5-point median filter having pixel i, E, W, N, and S signals as inputs provided advantageous results in high motion areas because the filter was partially biased toward using one of pixel N, S, and i signals, where pixel i signal tends toward $S_{av}$.

Embodiments of the present invention provide advantageously prediction of pixel values for de-interlacing interlaced scan video signals, generating progressive frames from interlaced scan video signals, etc. Embodiments of the present invention can be simpler than motion vector based de-interlacing schemes. Embodiments of the present invention can provide superior results than known median filter based schemes. Simple three-point median filters typically can not preserve high details. Weighted median filters can require large median filters and can be hard to characterize and predict. A Finite Impulse Response (FIR) median hybrid filter may not be motion adaptive. Whereas known de-interlacing methods introduce new pixel values that are computed as a weighted sum of surrounding (e.g., spatial, temporal, etc.) pixels, embodiments of the present invention can introduce new interpolated values only when the interpolated value is found to be a very good representation of the surrounding pixels.

Embodiments of the present invention can be motion adaptive, preserve high details in no/low motion areas, reduce interlace artifacts, and generally perform better than vertical averaging in high motion areas.

Figure 4:
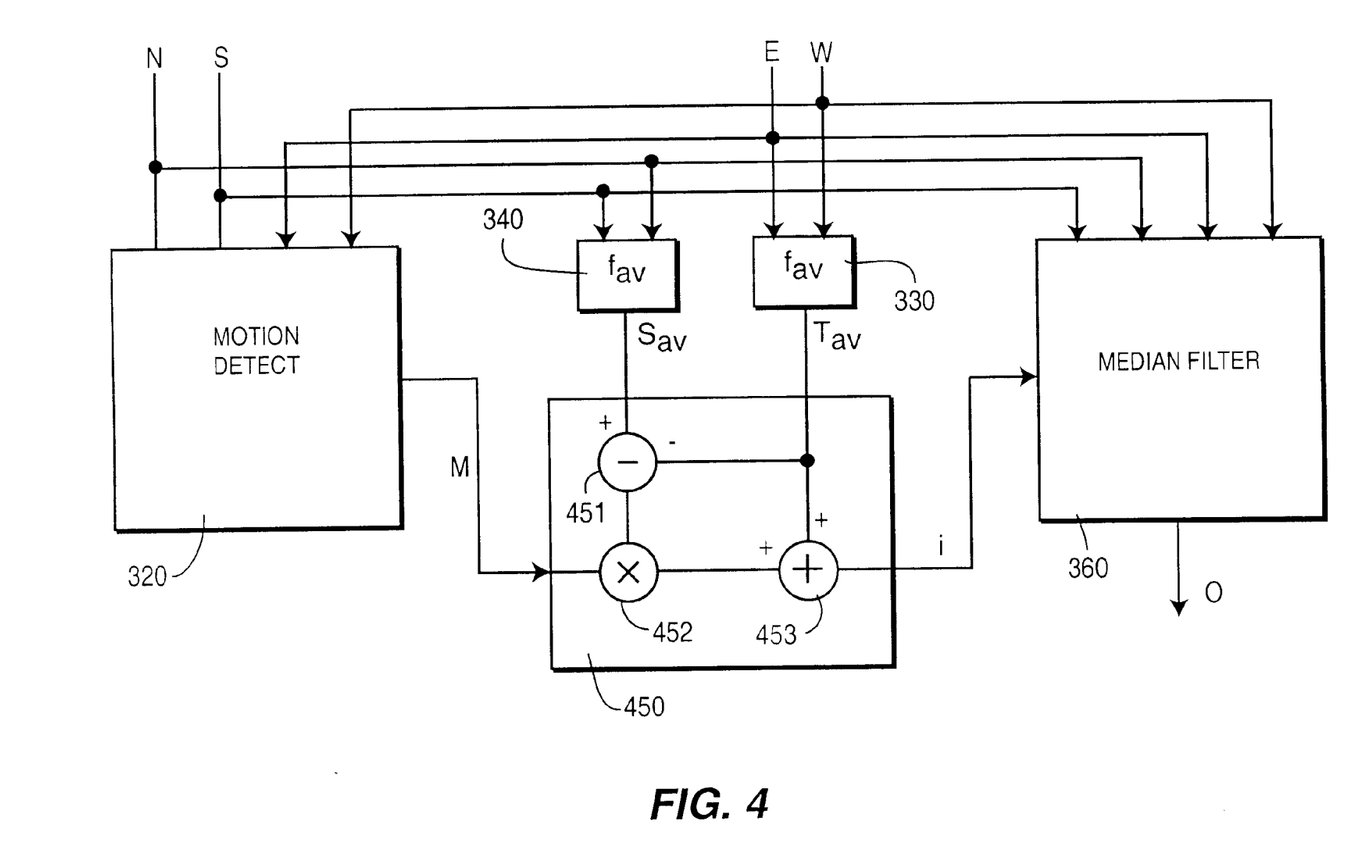
FIG. 4 shows a more detailed illustration of a portion of the apparatus illustrated in FIG. 3.

FIG. 4 shows a more detailed illustration of a portion of the apparatus illustrated in FIG. 3. In one embodiment of the present invention, a soft switch 450 can output an interpolated pixel i signal based on receiving temporal average signal $T_{av}$ and spatial average signal $S_{av}$ as signal inputs and motion signal M as a control input. In one embodiment, interpolated pixel i signal equals (M*($S_{av}$−$T_{av}$))+$T_{av}$ generated by subtractor 451, multiplier 452, and adder 453.

Figure 5:
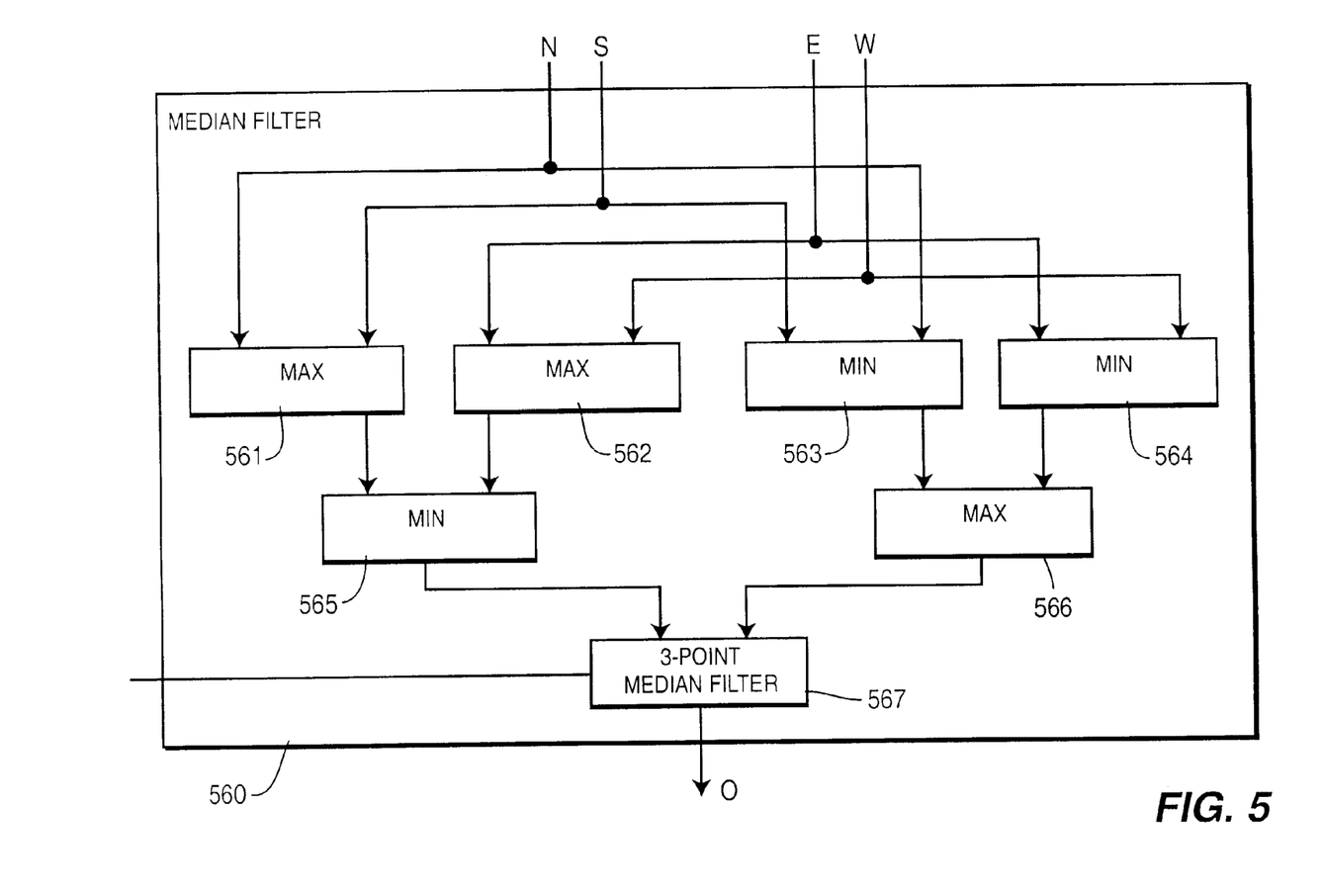
FIG. 5 shows an illustration of a median filter in accordance with an embodiment of the present invention.

FIG. 5 shows an illustration of a median filter in accordance with an embodiment of the present invention. Embodiments of the present invention do not require a full 5-point median filter, and can be efficiently implemented in hardware using comparators (e.g., minimum comparators, maximum comparators). Interpolated pixel i signal, being a weighted sum of pixel N, S, E, and W signals, will be greater than the minimum (N, S, E, W) and less than maximum (N, S, E, W). Accordingly, in one embodiment, a five-input median filter 560 can be implemented as MEDIAN (i, min(max(n,s), max(e,w)), max(min(n,s), min(e,w))) and require only a 3-point median filter. MAX 561 can output the greater of N and S, and MAX 562 can output the greater of E and W. MIN 563 can output the lesser of N and S, and MIN 564 can output the lesser of E and W. MIN 565 can output the lesser of the output of MAX 561 and MAX 562. MAX 566 can output the greater of MIN 563 and MIN 564. 3-point median filter 567 can output the median of i, the output of MIN 565 (i.e., min(max(n,s), max(e,w) )), and the output of MAX 566 (i.e., max(min(n,s), min(e,w))).

Embodiments of the present invention can be advantageous motion adaptive filters. In accordance an embodiment of the present invention, at zero motion, pixel i equals pixel E (and pixel E equals pixel W), and the filter output pixel O equals pixel i (i.e., equals pixel E and pixel W). At low motion, pixel i approaches $T_{av}$, and the filter output pixel O is biased toward one of pixel E, W, or i. As motion increases, pixel i approaches $S_{av}$, and the filter output pixel O is biased toward one of pixel N, S, or i. In low motion areas when pixels are well co-related, pixels E, W, and i can fall between pixel N and S, and the filter output pixel O is the median of pixel E, W, or i. In low motion areas when pixels are not well co-related, pixels E, W, and i do not fall between pixel N and S, and the filter output pixel O is biased towards choosing the one of pixel E, W, or i that is closest to $S_{av}$. In high motion areas, pixel i approaches $T_{av}$, the filter output pixel O is biased towards choosing the one of pixel N, S, or i that is closest to $T_{av}$. The filter output is not always using one of i, $S_{av}$, or $T_{av}$, but can choose one of pixels N, S, E, and W (i.e., can allow pixel repeating), when one of pixels N, S, E, and W is better representative of the set of pixels N, S, E, W, and i. Other known median filter based de-interlacing schemes do not allow for pixel repeating. Embodiments of the present invention can advantageously reduce interlace artifacts and preserve details in stationary (e.g., no motion, low motion, etc.) areas.

Figure 6:
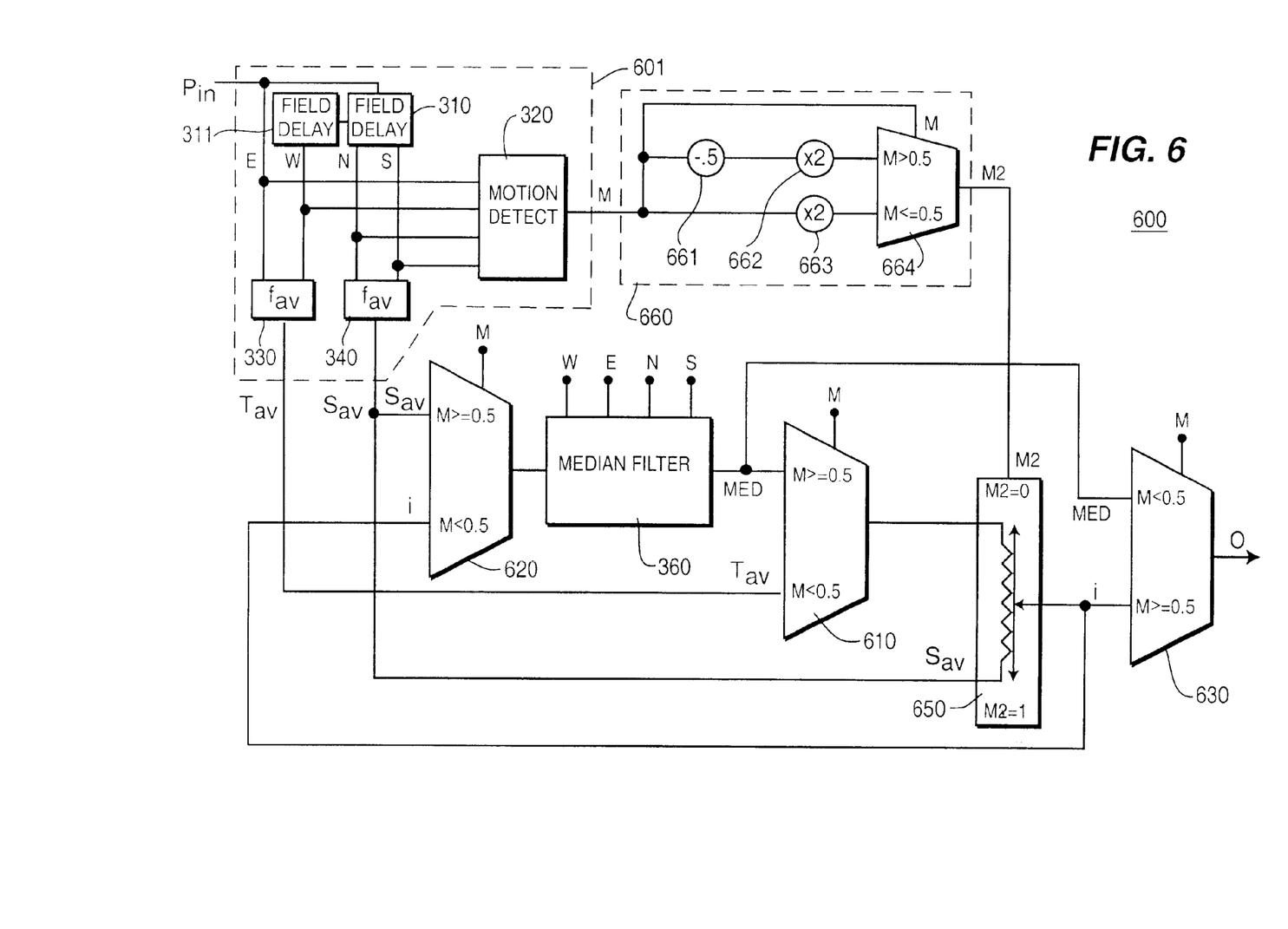
FIG. 6 shows an apparatus in accordance with an embodiment of the present invention.

FIG. 6 shows an apparatus in accordance with an embodiment of the present invention. Motion adaptive median filter 600 can advantageously further reduce artifacts in high motion areas. High motion areas of concern include those where MIN (EB,W)>>MAX (N,S) and MAX (E, W)<<MIN (N,S). Under such conditions, a median filter can pick the one of pixel N and S that is closer to $T_{av}$ when $T_{av}$ is considerably different from pixel N and S, and thereby introduce visible artifacts. Embodiments of the present invention can address such conditions. The embodiment illustrated in FIG. 3 can be modified as illustrated in FIG. 6 to reduce artifacts in high motion areas.

A pixel sequence $P_{in}$ can be received by signal processing circuit 610 to generate temporal average signal $T_{av}$, spatial average signal $S_{av}$, and motion signal M. Signal processing circuit 610, in one embodiment, includes field delays 310 and 311, motion detect circuit 320, and averaging circuits 330 and 340 described in FIG. 3. In one embodiment, the motion range of the motion detect 320 can be doubled by halving the slope control by setting $K_s$ to 16.

A second motion signal M2 can be generated by motion signal processing circuit 660. In one embodiment, multiplexer 664 outputs one of two signals generated based at least in part on motion signal M. Multiplier 663 can generate a signal of 2*M as an input to multiplexer 664, and subtractor 661 and multiplier 662 can generate a signal of 2*(M−0.5) as an input to multiplexer 664. Mulitplexer 664 can output second motion signal M2 as 2*M when motion signal M is <=0.5, and can output second motion signal M2 as 2*(M−0.5) when motion signal M is >0.5.

Motion adaptive median filter 600 (filter 600) can operate in a first mode when motion signal M<0.5 and in a second mode when motion signal M>=0.5. In the first mode of operation of filter 600 (e.g., during no motion, low motion, etc.), when M<0.5, multiplexer 610 outputs $T_{av}$ to soft switch 650. $S_{av}$ is also an input to soft switch 650, and soft switch 650 outputs pixel i signal (i.e., the weighted average of $T_{av}$ and $S_{av}$ when M<0.5) as second motion signal M2 varies from zero to one. Multiplexer 620 outputs pixel i signal to median filter 360, and median filter 360 outputs the median of pixel W, E, N, S, i signals, i.e., median signal MED. Multiplexer 630 outputs the median signal MED as the pixel O signal when M<0.5.

In the second mode of operation of filter 600 (e.g., during high motion, etc.), when M>=0.5, multiplexer 620 outputs $S_{av}$ to median filter 360, and median filter 360 outputs the median of signals W, E, N, S, $S_{av}$, i.e., median signal MED. Multiplexer 610 outputs MED to soft switch 650. $S_{av}$ is also an input to soft switch 650, and soft switch 650 outputs pixel i signal (i.e., the weighted average of MED and $S_{av}$ when M>=0.5) as second motion signal M2 varies from zero to one. Multiplexer 630 outputs the pixel i signal as the pixel O signal when M>=0.5. In another embodiment, multiplexors 610, 620, 630, 664 can be a hard switch, a selector, etc.

Figure 7:
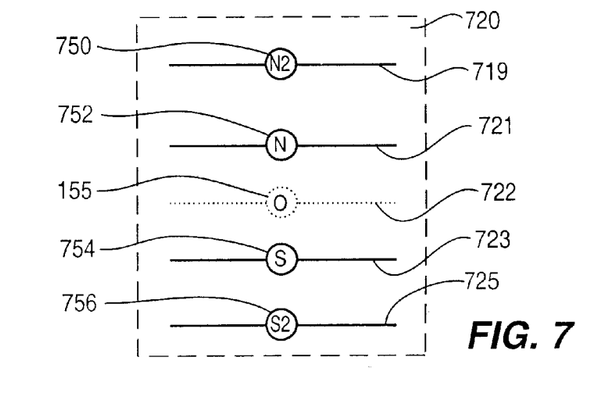
FIG. 7 shows pixels in accordance with an embodiment of the present invention.

FIG. 7 shows pixels in accordance with an embodiment of the present invention. In an embodiment of the present invention, $S_{av}$ is generated by a four tap vertical filter. Rather than averaging pixel N and S (e.g., pixel N 152 and pixel S 154 of FIG. 1) to generate $S_{av}$ as part of predicting pixel O 155 of scan line 722, a four tap vertical filter generates $S_{av}$ based on pixel N2 750 of scan line 719, pixel N 752 of scan line 721, pixel S 754 of scan line 723, and pixel S2 756 of scan line 725. In one embodiment, a four tap vertical filter generates $S_{av}$ as equaling $((-1/16)*N2)+((9/16)*N)+((9/16)*S)+((-1/16)*S2)$. Embodiments of a four tap vertical filter can be implemented using shifts and adds, and embodiments of the present invention generating $S_{av}$ from a four tap vertical filter can improve picture quality in high motion areas.

Embodiments of methods and apparatus to de-interlace interlaced scan video signals have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

Embodiments of the present invention encompass systems incorporating a motion adaptive median filter including systems such as a video system of a computer, a television, an HDTV receiver/decoder, an SDTV receiver/decoder, an MPEG decoder, digital versatile disc (DVD) player, portable video player, home video system, digital video receiver, etc.

In the foregoing detailed description, apparatus and methods in accordance with embodiments of the present invention have been described with reference to specific exemplary embodiments. Accordingly, the present specification and figures are to be regarded as illustrative rather than restrictive.

I claim:

1. An apparatus to generate a predicted pixel value of a predicted pixel value of a predicted pixel for deinterlacing an interlaced video signal, the interlaced video signal defining a current field, a next field and a previous field, the interlaced video signal including a sequence of pixel values, the apparatus comprising:

a motion detect circuit to generate a motion value based at least in part on a first pixel value, a second pixel value, a third pixel value, and a fourth pixel value;

a soft switch to receive a temporal interpolation value, a spatial interpolation value, and the motion value, the soft switch to output a weighted average value, the weighted average value based at least in part on the temporal interpolation value, the spatial interpolation value, and the motion value, the spatial interpolation value based at least in part on the first pixel value and the second pixel value, the temporal interpolation value based on the third pixel value and the fourth pixel value;

a median filter to output the predicted pixel value based at least in part on the first pixel value, the second pixel value, the third pixel value, the fourth pixel value, and the weighted average value;

a signal processing circuit to receive the sequence of pixel values and output the first pixel value, the second pixel value, and the fourth pixel value;

a first averaging circuit to generate the temporal interpolation value based on the third pixel value and the fourth pixel value; and, a second averaging circuit to generate the spatial interpolation value based on the first pixel value and the second pixel value.

2. The apparatus of claim 1, wherein the first pixel value corresponds to a pixel of a first scan line of the current field, the second pixel value corresponds to a pixel of a second scan line of the current field, the third pixel value corresponds to a pixel of the next field, and the fourth pixel value corresponds to a pixel of the previous field, the first scan line and the second scan line being successive interlaced scan lines of the current field, the predicted pixel having a horizontal position equal to the horizontal position of the pixel of the first scan line and the pixel of the second scan line, the predicted pixel having a vertical position between the pixel of the first scan line and the pixel of the second scan line, the pixel of the next field having a vertical and horizontal position equal to the vertical and horizontal position of the predicted pixel, the pixel of the previous field having a vertical and horizontal position equal to the vertical and horizontal position of the predicted pixel.

3. A motion adaptive median filter, comprising:

a motion detect circuit having an output;

a motion signal processing circuit having an input and an output, the input of the motion signal processing circuit coupled to the output of the motion detect circuit;

a first selector having a first input, a second input, a third input, and an output, the first input coupled to the output of the motion detect circuit;

a soft switch having a first input, a second input, a third input, and an output, the first input of the soft switch coupled to the output of the motion signal processing circuit, the second input of the soft switch coupled to the output of the first selector;

a second selector having a first input, a second input, a third input, and an output, the first input of the second selector coupled to the output of the motion detect circuit, the third input of the second selector coupled to the output of the soft switch;

a median filter having a first input and an output, the input of the median filter coupled to the output of the second selector, the first output of the median filter coupled to the second input of the first selector; and a third selector, having a first input, a second input, a third input, and an output, the first input of the third selector coupled to the output of the motion detect circuit, the second input of the third selector coupled to the output of the median filter, the third input of the third selector coupled to the output of the soft switch.

4. The motion adaptive median filter of claim 3, wherein:

the motion detect circuit has a first input, a second input, a third input, and a fourth input, the first input of the motion detect circuit to receive a first pixel value, the second input to receive a second pixel value, the third input to receive a third pixel value, and the fourth input to receive a fourth pixel value; and the median filter has a second input, a third input, a fourth input, and a fifth input, the second input of the motion detect circuit to receive a first pixel value, the third input to receive a second pixel value, the fourth input to receive a third pixel value, and the fifth input to receive a fourth pixel value.

5. The motion adaptive filter of claim 4, wherein:

the second input of the second selector is to receive a spatial interpolation value based at least in part on the first pixel value and the second pixel value;

the third input of the first selector is to receive a temporal interpolation value based at least in part on the third pixel value and the fourth pixel value; and the third input of the soft switch is to receive the spatial interpolation value.

6. The motion adaptive filter of claim 5, wherein:

the motion detect circuit is to output a motion value, the motion value having a first value range and a second value range;

the first selector is to output the value at the third input of the first selector when the motion value is within the first value range, and output the value at the second input of the first selector when the motion value is within the second value range;

the second selector is to output the value at the third input of the second selector when the motion value is within the first value range and output the value at the second input of the second selector when the motion value is within the second value range; and the third selector is to output the value at the second input of the third selector when the motion value is within the first value range and output the value at the third input of the third selector when the motion value is within the second value range.

7. The motion adaptive filter of claim 6, wherein the motion signal processing circuit includes a fourth selector, the fourth selector having a first input, a second input, and a third input, the first input of the fourth selector coupled to the output of the motion detect circuit, the second input of the fourth selector coupled to a first multiplier, the first multiplier coupled to a subtractor, the subtractor coupled to the output of the motion detect circuit, the third input of the fourth selector coupled to a second multiplier, the second multiplier coupled to the output of the motion detect circuit.

8. The motion adaptive filter of claim 4, wherein the motion adaptive filter is to generated a predicted pixel value of a predicted pixel for de-interlacing an interlaced video signal, the interlaced video signal defining a current field, a next field and a previous field, the interlaced video signal including a sequence of pixel values, the first pixel value corresponds to a pixel of a first scan line of the current field, the second pixel value corresponds to a pixel of a second scan line of the current field, the third pixel value corresponds to a pixel of the next field, and the fourth pixel value corresponds to a pixel of the previous field, the first scan line and the second scan line being successive interlaced scan lines of the current field, the predicted pixel having a horizontal position equal to the horizontal position of the pixel of the first scan line and the pixel of the second scan line, the predicted pixel having a vertical position between the pixel of the first scan line and the pixel of the second scan line, the pixel of the next field having a vertical and horizontal position equal to the vertical and horizontal position of the predicted pixel, the pixel of the previous field having a vertical and horizontal position equal to the vertical and horizontal position of the predicted pixel.

9. A method to generate a predicted pixel value of a predicted pixel for deinterlacing an interlaced video signals, the interlaced video signal including a current field, a next values, the method comprising:

generating a spatial interpolation value based on a first pixel value and a second pixel value;

generating a temporal interpoltion value based on a third pixel value and a fourth pixel value;

generating a motion value based at least in part on the first pixel value, the second pixel value, the third pixel value and the forth pixel value;

selectively outputting a weighted average value of the spatial interpolation value and the temporal interpolation value based at least in part on the motion value, the motion value comprising a weighting factor of the weighted average value; and median filtering the weighted average value, the first pixel value, the second pixel value, the third pixel value and the fourth pixel value;

wherein the first pixel value corresponds to a pixel of a first scan line of the current field, the second pixel value corresponds to a pixel of a second scan line of the current field, the third pixel value corresponds to a pixel of the next field, and the fourth pixel value corresponds to a pixel of the previous filed, the first scan line and the second scan line being successive interlaced scan lines of the current field, the predicted pixel having a horizontal position equal to the horizontal position of the pixel of the first scan line and the pixel of the second scan line, the predicted pixel having a vertical position between the pixel of the first scan line and the pixel of the second scan line, the pixel of the next field having a vertical and a horizontal position equal to the vertical and horizontal position of the predicted pixel, the pixel of the previous field having a vertical and horizontal position equal to the vertical and horizontal position of the predicted pixel.

10. A method to generate a predicted pixel value of a predicted pixel for de-interlacing an interlaced video signal, the interlaced video signal defining a current field, a next field and a previous field, the interlaced video signal including a sequence of pixel values, the method comprising:

generating a spatial interpolation value based on a first pixel value and a second pixel value;

generating a temporal interpolation value based on a third pixel value and a fourth pixel value;

generating a first motion value based at least in part on the first pixel value, the second pixel value, the third pixel value and the fourth pixel value;

generating a second motion value based at least in part on the first motion value; and when the first motion value is within a first value range, generating a first weighted average value of the spatial interpolation value and the temporal interpolation value based at least in part on the second motion value, the second motion value comprising a weighting factor of the first weighted average value; and median filtering the first weighted average value, the first pixel value, the second pixel value, the third pixel value, and the fourth pixel value.

11. The method of claim 10, further comprising:

when the first motion value is within a second value range, generating a median filter output based at least in part on median filtering the spatial interpolation value, the first pixel value, the second pixel value, the third pixel value, and the fourth pixel value;

generating a second weighted average value of the median filter output and the temporal interpolation value based at least in part on the second motion value, the second motion value comprising a weighting factor of the second weighted average value.

12. The method of claim 11, wherein the first pixel value corresponds to a pixel of a first scan line of the current field, the second pixel value corresponds to a pixel of a second scan line of the current field, the third pixel value corresponds to a pixel of the next field, and the fourth pixel value corresponds to a pixel of the previous field, the first scan line and the second scan line being successive interlaced scan lines of the current field, the predicted pixel having a horizontal position equal to the horizontal position of the pixel of the first scan line and the pixel of the second scan line, the predicted pixel having a vertical position between the pixel of the first scan line and the pixel of the second scan line, the pixel of the next field having a vertical and horizontal position equal to the vertical and horizontal position of the predicted pixel, the pixel of the previous field having a vertical and horizontal position equal to the vertical and horizontal position of the predicted pixel.

\* \* \* \* \*